Figure 1:
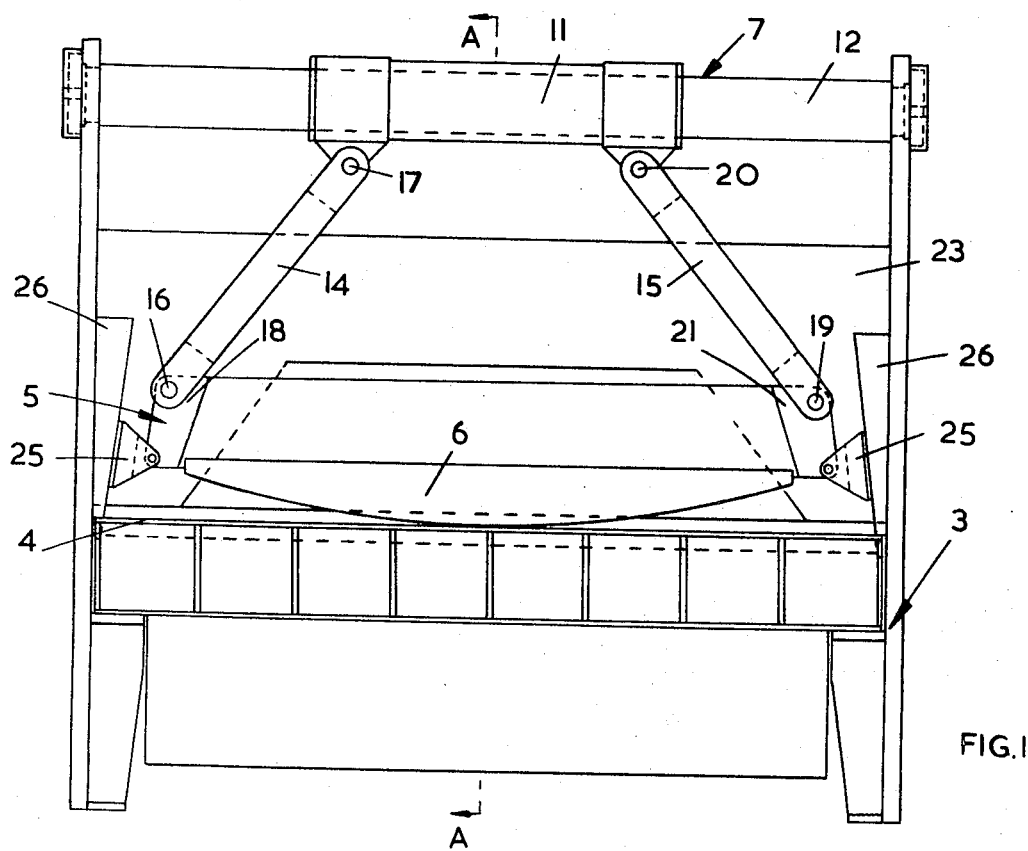

United States Patent [19]
Handley

[11] 3,857,316
[45] Dec. 31, 1974

[54] SHEAR CUTTER
[76] Inventor: Alan Roy Handley, 6 Oak Tree Gdns., Wordesley, England
[22] Filed: Sept. 10, 1973
[21] Appl. No.: 395,639

[30] Foreign Application Priority Data
Sept. 9, 1972 Great Britain.................. 41975/72

[52] U.S. Cl. ............................................. 83/644
[51] Int. Cl............................. B26d 5/08, B26f 1/44
[58] Field of Search........................... 83/644, 647.5

[56] References Cited
UNITED STATES PATENTS
508,329  11/1893  Malm............................... 83/643 X
3,316,791  5/1967  Greis et al. ...................... 83/644 X FOREIGN PATENTS OR APPLICATIONS
845,004  7/1952  Germany............................. 83/644
1,230,720  5/1971  Great Britain....................... 83/644

Primary Examiner—Willie G. Abercrombie
Attorney, Agent, or Firm—Holman & Stern

[57] ABSTRACT

A shear cutter comprises a frame, a fixed, lower blade mounted on the frame and a curved, upper blade mounted for movement relative to the lower blade on a pair of links pivotally attached to a yoke disposed above the blades. The yoke is reciprocated by a movable cylinder of an hydraulic piston and cylinder arrangement. A pair of slippers are pivotally mounted at opposite ends of the upper blade and engage against respective guides on the frame to prevent longitudinal movement of the upper blade. The upper blade is constrained by the links to move in such a manner that the point about which the upper blade pivots moves along the curved cutting edge thereof.

14 Claims, 3 Drawing Figures

SHEAR CUTTER

This invention relates to shear cutters.

According to one aspect of the present invention, there is provided a shear cutter comprising a first blade, a second blade having a curved cutting edge co-operating with the first blade, and means for oscillating the second blade, said oscillating means being adapted, in use, to move the second blade in such a manner that the pivot point of the second blade moves along the said curved cutting edge, said oscillating means including a member which is linearly oscillatable in or parallel to the plane of oscillation of the second blade, and a pair of spaced links which are pivotally attached to the member at one end of their respective ends and are pivotally connected with the second blade at spaced locations at the other of their respective ends.

According to another aspect of the present invention, there is provided a shear cutter comprising a frame, a first blade, a second blade having a curved cutting edge co-operating with the first blade, means for oscillating the second blade relative to the first blade and the frame, said oscillating means being adapted, in use, to move the second blade in such a manner that the pivot point of the second blade moves along said curved cutting edge, and a pair of guide means for guiding the second blade in its oscillating movement, each pair of guide means including mutually engaging slide and pivotal slipper portions which are relatively slidable during oscillatory movement of the second blade, one of said portions being associated with the second blade and the other of said portions being associated with the frame so that, in use, the pair of guide means prevents longitudinal movement of the second blade.

Figure 2:
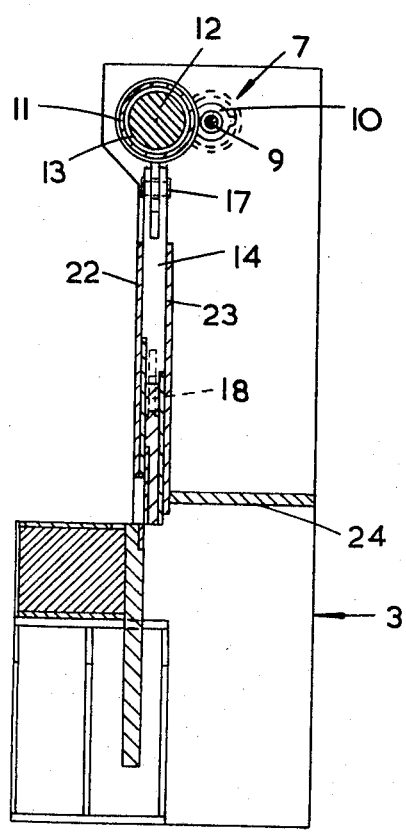
Figure 3:
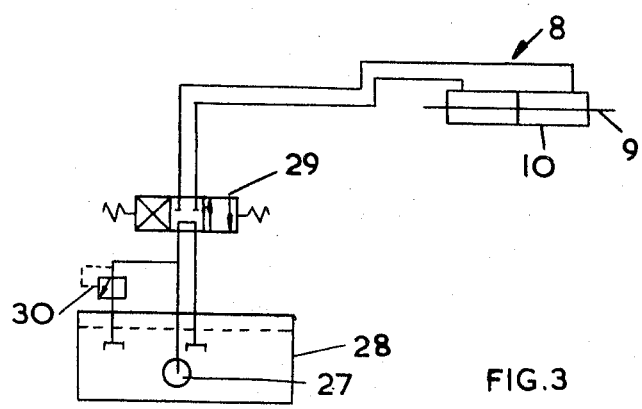

An embodiment of the present invention will now be described, by way of example, with reference to the accompanying drawings, in which:

FIG. 1 is a longitudinal side elevation of a shear cutter according to the present invention, FIG. 2 is a section on the line A—A of FIG. 1, and FIG. 3 is a circuit diagram of the operating circuit for the shear cutter of FIGS. 1 and 2.

Referring to the drawings, the shear cutter comprises a frame 3 carrying a first fixed cutter blade indicated generally at 4 having a linear cutting edge, a second pivotal cutter blade assembly 5 having a replaceable, arcuate cutting edge 6, and an oscillating mechanism indicated generally at 7 for the second cutter blade assembly 5.

The oscillating mechanism 7 comprises a double-acting piston and cylinder device 8 having a piston rod 9 which extends through the cylinder 10 and is fixed at its ends to the frame 3. The cylinder 10 is secured to a yoke 11 slidable on a main shaft 12 so as to be linearly reciprocable by the piston and cylinder device 8 in a plane in which the pivotal cutter blade assembly 5 oscillates. A bearing 13 is provided between the yoke 11 and shaft 12. A pair of links 14 and 15 extend between the yoke 11 and the blade assembly 5. The ends of link 14 are respectively pivotally attached by pivots 16 and 17 to assembly 5 and yoke 11, part of the blade assembly extending into a recess 18 in the link 14. Similarly the ends of link 15 are respectively pivotally attached by pivots 19 and 20 to assembly 5 and yoke 11, the link 15 extending into a recess 21 in the blade assembly 5. As can be seen from FIG. 1, pivot 17 is spaced from pivot 20 and pivot 16 is spaced from pivot 19. Front and back plates 22 and 23, respectively, cover the links 14 and 15 for safety reasons and also to provide a degree of protection against ingress of dirt. The plates 22 and 23 are secured at their ends to the frame 3 and plate 23 is further supported on the frame 3 by a support flange 24.

The blade assembly 5 is slidable relative to the plates 22 and 23 and is guided thereby in its movement so that twisting of the assembly 5 is resisted.

The cutter edge 6 of the pivotal cutter blade assembly 5 does not extend to the ends of the assembly 5 but terminates at positions intermediate the ends of the assembly 5 so as to provide a space at each end of the assembly 5 for insertion of material to be cut. At each end of the cutter blade 5, there is pivotally attached a shoe or slipper 25 which engages against a slide 26 attached to the frame 3. As can be seen from FIG. 1, each slide 26 is linear.

Referring now to FIG. 3, the piston and cylinder device 8 is operated by a very simple control circuit comprising a pump 27 serving to supply hydraulic fluid from a reservoir 28 to a three position spool valve 29. The spool valve 29 is shown in FIG. 3 in a central position in which flow of hydraulic fluid to the device is blocked. In the two other positions of the valve 29, fluid is supplied to one or other end of the device so that the cylinder 10 can be reciprocated by appropriate operation of valve 29. A pressure relief valve 30 is connected downstream of the pump 27 to prevent too great a pressure build-up in the event of overload of the shear cutter in use.

Reciprocation of the cylinder 10 of piston and cylinder device 8 causes linear reciprocation of the yoke 11 on shaft 12 and consequent oscillation of the pivotal cutter blade assembly 5. The arrangement of the links 14 and 15 relative to the yoke 11 and assembly 5 is such that a positive oscillatory movement is imparted to each end of the blade assembly 5 and the latter moves in such a manner that the pivot point of the assembly oscillates along the arcuate cutter edge 6. This means that the linear cutting edge of the fixed cutter 4, at any instant, lies parallel to a tangent to the cutter edge 6 at the pivot point of the assembly 5.

During movement of the assembly 5, the slippers 25 engage against and slide relative to the respective slides 26 to prevent the assembly 5 from sliding longitudinally relative to the cutter blade 4. This design of guide arrangement provides a considerable advantage over existing guide arrangements which either do not prevent longitudinal sliding movement of the pivotal blade or, alternatively, are of very complicated form.

The oscillating mechanism described above represents a considerable advance over existing oscillating arrangements which are either cumbersome or require quite complicated control circuitry to maintain the correct blade movement.

Due to the fact that the cutter edge 6 terminates short of the ends of the assembly 5, material to be cut can be inserted between the assembly 5 and the fixed cutter 4 when the former is in either of its extreme pivotal positions due to the aforesaid space provided. This is assisted by arranging the piston and cylinder device 8 to move each link 14, 15 at the respective end of reciprocation so that the pivot 17, 20 lies overcentre with respect to respective pivot 16, 19 whereby the blade assembly 5 is lifted to bring cutter edge 6 clear of cutter 4. The slides 26 are generally of linear form over the length thereof traversed by the slippers 25 during oscillation of the assembly 5.

In the above embodiment, the oscillating yoke 11 is disposed in the plane of oscillation of the assembly 5. However, it is also within the scope of the invention to arrange the yoke 11 to oscillate in a plane parallel to the said plane of oscillation of assembly 5.

I claim:

1. A shear cutter comprising a first blade, a second blade having a curved cutting edge co-operating with the first blade, and means for oscillating the second blade, said oscillating means being adapted, in use, to move the second blade in such a manner that the pivot point of the second blade moves along the said curved cutting edge, said oscillating means including a member which is linearly oscillatable in or parallel to the plane of oscillation of the second blade, and a pair of spaced links which are pivotally attached to the member at one of their respective ends and are pivotally connected with the second blade at spaced locations at the other of their respective ends.

2. The shear cutter as claimed in claim 1, wherein the linearly oscillatable means is mounted to be slidable relative to a shaft carried by the frame.

3. The shear cutter as claimed in claim 1, wherein the linearly oscillatable means is in the form of a yoke surrounding the shaft.

4. The shear cutter as claimed in claim 1 wherein a piston and cylinder device is provided for oscillating said linearly oscillatable means.

5. The shear cutter as claimed in claim 4, wherein the piston of the piston and cylinder device is fixed relative to the frame and the cylinder of the device is movable relative to the frame and operably connected to the oscillatable member.

6. A shear cutter comprising a frame, a first blade, a second blade having a curved cutting edge co-operating with the first blade, means for oscillating the second blade relative to the first blade and the frame, said oscillating means being adapted, in use, to move the second blade in such a manner that the pivot point of the second blade moves along said curved cutting edge, and a pair of guide means for guiding the second blade in its oscillatory movement, each pair of guide means including mutually engaging fixed slide and pivotal slipper portions which are relatively slidable during oscillatory movement of the second blade, one of said portions being associated with the second blade and the other of said portions being associated with the frame so that, in use, the pair of guide means prevents longitudinal movement of the second blade.

7. The shear cutter as claimed in claim 6, wherein the slide and pivotal slipper portions have mutually engaging surfaces which are substantially planar.

8. The shear cutter as claimed in claim 6, wherein each pivotal slipper portion is associated with the second blade and each slide portion is associated with the frame.

9. The shear cutter as claimed in claim 6, wherein the second blade is mounted on a blade support extending longitudinally of the second blade and the guide means portions associated with the second blade are mounted at opposite ends of the blade support.

10. The shear cutter as claimed in claim 1, wherein the first blade is a fixed blade.

11. The shear cutter as claimed in claim 6, wherein the oscillating means includes a member which is linearly oscillatable in or parallel to the plane of oscillation of the second blade, and a pair of spaced links which are pivotally attached to the member in spaced relationship at one of their respective ends and are pivotally connected with the second blade at spaced locations at the other of their respective ends.

12. The shear cutter as claimed in claim 11, wherein the linearly oscillatable member is slidable on a shaft carried by the frame.

13. The shear cutter as claimed in claim 11, wherein the linearly oscillatable member is arranged to be oscillated by a piston and cylinder device.

14. The shear cutter as claimed in claim 13, wherein the piston of the piston and cylinder device is fixed relative to the frame and the cylinder of the device is movable relative to the frame and operably connected to the oscillatable member.

* * * * *